May 3, 1949. W. S. COLLIER 2,468,866
OIL FILTER AND COOLER
Filed Sept. 21, 1945 2 Sheets-Sheet 1
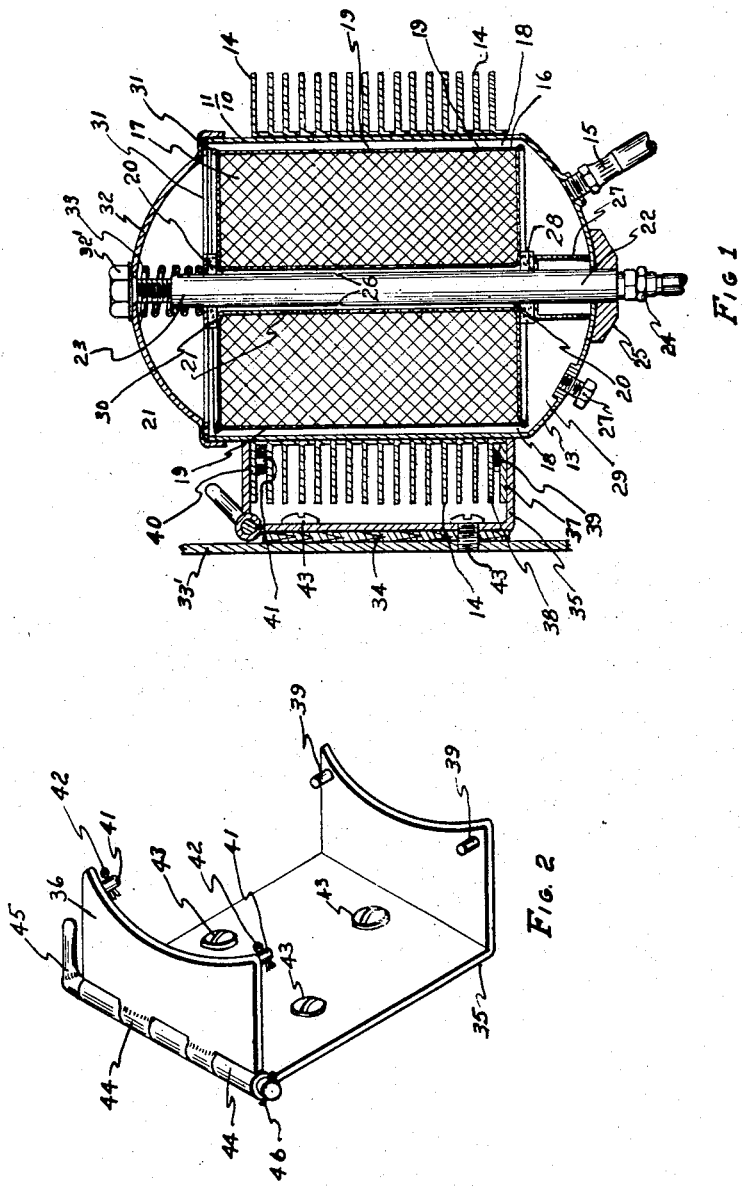
INVENTOR.
WILLIAM S. COLLIER
BY Benedict & Swartwood
ATTORNEYS May 3, 1949. W. S. COLLIER 2,468,866
OIL FILTER AND COOLER
Filed Sept. 21, 1945 2 Sheets-Sheet 2

INVENTOR.
WILLIAM S. COLLIER
BY Benedict Swartwood
ATTORNEYS

Patented May 3, 1949

2,468,866

UNITED STATES PATENT OFFICE 2,468,866

OIL FILTER AND COOLER

William S. Collier, Danville, Ill.

Application September 21, 1945, Serial No. 617,809

1 Claim. (Cl. 210—122.5)

This invention relates to oil filters and coolers and particularly to oil filters and coolers for use in connection with internal combustion engines.

In regard to lubrication of internal combustion engines there are two important problems. One of the problems is to prevent an accumulation of foreign and deleterious matter in the oil such as sludge, dirt, carbon and the like which will tend to score the working parts such as the pistons. If a filter is not used to continuously remove such foreign matter, the lubricating oil must be frequently changed to remove the foreign and harmful materials and changed more frequently than is necessary, since the oil still has good lubricating properties. An oil filter, connected to the discharge side of the oil circulation pump for internal combustion engines, continuously removes the foreign matter and by appropriate replacement of the filter material will permit much longer use of the lubricating oil than is otherwise possible.

The second problem is one of cooling the lubricating oil. Most internal combustion engines have cooling means such as a radiator, either water-cooled or air-cooled, which cools to some extent the lubricating oil and also the mechanical parts. However it is desirable that the lubricating oil should be further cooled by more direct means which also reduces the temperature on the metal working parts. Various cooling means for the lubrication oil have been tried but most of them are independent of the oil filter means.

It is therefore an object of this invention to have a combined continuous oil filter and cooler in one simple, compact apparatus which is cheap and economical to build and in which substantial cooling is obtained and substantially all of the foreign matter is removed. The cost of construction is an important consideration in such a combined cooler and filter and most of those previously designed are clumsy in their construction and are expensive to build. None of them have the compact and economical features of my combined cooler and filter.

It is also an object of my invention to provide means in which the oil filter and cooler may be readily detached from the frame associated with the internal combustion engine without having to remove the hose connections. Most of the filters now in use do not have the feature of ready detachability which is important not only from the view point of the owner of an automobile but also from the view point of garage mechanics, filling station attendants and others who must frequently replace the filtering material and clean the filter container. It is obvious that it is much faster to clean the filter if it can be readily detached without removing the hose connections.

It is also an object of my invention to have a balanced pressure throughout the unit in order that the oil will flow through the filter to obtain proper filtering and cooling.

In one of the broad aspects of my invention the combined oil filter and cooler comprises a cylindrical body, a container for containing filter material in said body, a filter in said container, a plurality of spaced fins fixedly attached around the outer circumference of said body and extending radially outward from said body, an oil inlet to said body, an oil outlet from said body, means for the circulation of oil from the inlet to outlet comprising means for first contacting the oil with the inner wall of said body in order to cool the oil by said fins by radiation and means for then passing the cooled oil through said filter material to remove foreign matter and means to then remove the cooled and filtered oil through said outlet.

In one of its more specific aspects my invention comprises a cylindrical body closed at each end, a cylindrical container having a filter space for containing filtering material within said container, filtering material in said filter space, said container having its outer wall spaced from the inner wall of the body to form a first annular space, a circular length-wise opening in the container concentric with the first annular space, an oil inlet in one end of the body, a pipe through the circular length-wise opening and extending through the same end as the oil inlet forming an oil outlet, said pipe being closed at the opposite end from the oil outlet, said pipe being smaller in outside diameter than said circular opening to form a second annular space concentric with the first annular space, a plurality of spaced fins fixedly attached around the outer circumference of the cylindrical body and extending radially outward from said body and means for circulation of the oil through said filter and cooler comprising an oil reservoir connecting said inlet with said first annular space, a plurality of openings in the outer wall of said filter container connecting said filter space with said first annular space, a plurality of openings in the inner wall of said container connecting said filter space with said second annular space and an opening in said pipe connecting the second annular space with the oil outlet.

I have found by actual experiments on an internal combustion engine used in an automobile that not only is all of the foreign material removed, thus greatly extending the life of the lubricating oil as well as extending the life of the moving parts, but the oil temperature measured in the crank case was reduced on an average of about 50° to 100°. Somewhat higher reductions were also noted from the inlet to the outlet of the oil filter and cooler. The above reduction in temperature is typical of what has been obtained. Of course the temperature reduction or amount of cooling will vary depending upon the type of internal combustion engine with which my apparatus is used.

My combined filter and cooler is useful for all types of internal combustion engines and particularly where such engines are used in connection with automobiles, tractors, airplanes, boats, stationary engines and the like.

Other objects, advantages and uses of my invention will become apparent by referring to the accompanying drawings in which Figure 1 is a vertical cross-sectional view of the filter and cooler and showing the support means.

Figure 2 is the support means showing the manner in which the filter may be readily detached for cleaning.

Figure 4:
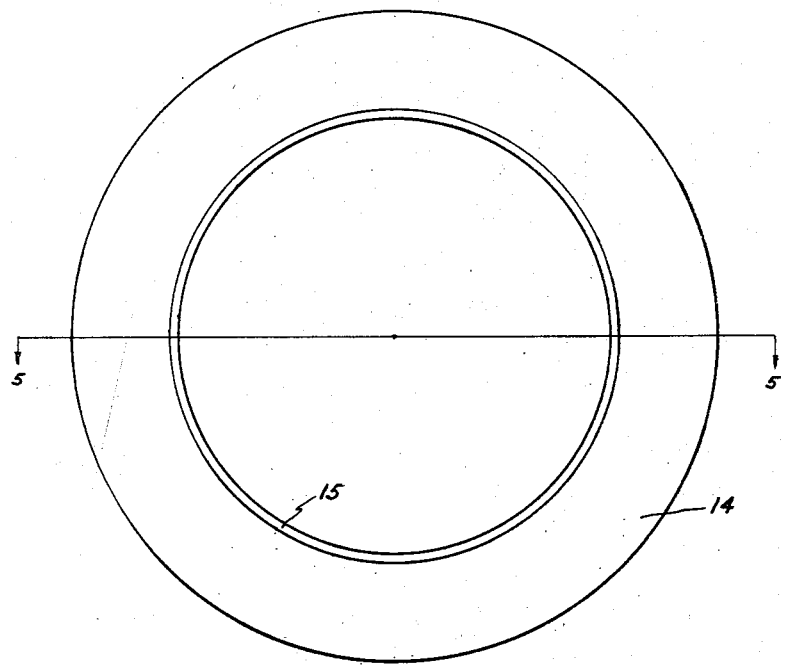
Figure 4 is a plan view of the cooling fins 14 shown in Figure 1.
Figure 5:
Figure 5 is a cross-sectional view of Figure 4.
Figure 3:
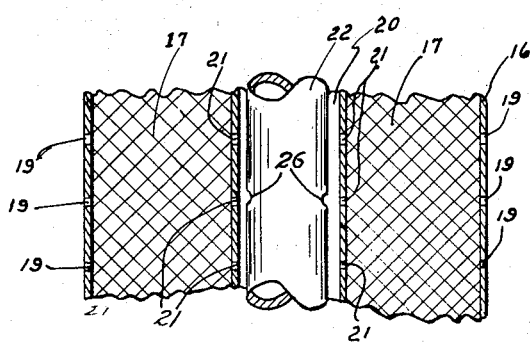
Figure 3 is a detailed view of a portion of Figure 1 showing the openings through which the oil flows through the filter and then out the outlet pipe.

Referring to the drawings and particularly to Figure 1, a cylindrical body 10 opened at end 11 and closed at end 12 by a concave closure 13 is provided. L-shaped annular fins 14 are spaced at regular intervals around the cylinder 10 and extend radially outward from the cylinder 10 in order to provide cooling by radiation for the hot oil passing through the combined cooler and filter. The cylindrical body 10 may be made of any suitable material but is preferably made of metallic material such as iron, brass, aluminum and the like and the fins 14 may be made of the same metal as for the body 10 or may be made of a different metallic material. The fins 14 are placed around the cylindrical body 10 and the flange portion 15 of the fins act as spacers although it is within the scope of my invention to have the fins 14 of different construction and different means of spacing them one from the other. The fins 14 may be fixedly attached to the body 10 in any suitable manner but it is preferred to attach them by welding, using induction welding methods. The threaded connection 15 forms the oil inlet to the cylindrical body 10.

An oil filter container 16 having an oil filter space containing filtering material 17 is provided. The oil container may be made of any suitable material such as cardboard, plastic and the like and need not necessarily be made of metal although it readily may be made of metal such as aluminum, copper and the like. The filtering material 17 may be of any suitable material which will filter out the extraneous material from the oil and is preferably a fibrous material such as cloth, fabric and the like. The container 16 has an over all diameter smaller than the internal diameter of body 10 so as to form an annular opening 18 between the outer circumference of the container and the inner circumference of the body 10. A plurality of spaced openings 19 are provided in the outer circumference of the container 16 throughout its length in order to provide a passage-way for the flow of oil from the annular space 18 into the filter space and through the filter material 17. Lengthwise through the container 16 is provided opening 20 which is a circular opening concentric with the annular space 18. A number of relative small openings 21 are provided in the inner wall of the container around its perimeter and throughout its length to permit passage-way for the oil from the filter material 17 into the circular opening 20. A pipe 22 is provided being closed at the end 23 and providing an oil outlet at the end 24. Boss 25 is welded to the concave closure 13 and has an opening therein in which the pipe 22 is also welded. The pipe 22 has an opening or openings 26 therein which provides a passage-way for the oil from the circular space 20 into the inside of the pipe through which the oil may eventually pass to the outlet 24. It has been found preferable to have two openings 26 opposing each other about mid-way lengthwise of the pipe 22 which obtains uniform flow of oil through the filter and also regulates uniformly the pressure throughout the apparatus to obtain proper cooling and filtering. A drainage plug 27 is provided in order that the cylindrical body 10 may be filled with a cleaning liquid such as kerosene and gasoline and can be flushed out through the opening after the plug 27 is removed.

The filter is preferably positioned in such a manner that it is coextensive with the cylindrical portion of the body 10 and does not extend into the concave portion or into the lid. The filter container 16 is loosely positioned around the pipe 22 in the cylindrical body 10 and to support it, a support 27 is provided which rests on the bottom of the concave closure 13. A washer 28 is provided which must fit tightly around the pipe 22 and it rests on a support 27 in order to seal off the opening 20 from the space 29. The space 29 formed between the bottom of the filter 16 and the concave closure 13 provides an oil reservoir and also obtains more uniform distribution of the oil through the system. The gasket 28 may be of any suitable material but is preferably made of cork or like material.

A gasket 30 similar to the gasket 28 is provided and it rests on the upper end of the container 16 and it is also for the purpose of sealing off the annular space 20. A third gasket 31 is provided for fitting around the pipe 22 and rests on the circumference of the upper end of the cylindrical body 10. A concave lid 32 is provided having lips which extend over and around the upper end of the cylindrical body 10 and when screwed on against gasket 31 seals the body 10 from the atmosphere. The lid 32 is detachably fastened to the cylindrical body 10 by means of the screw bolt 32' which engages female threads in the upper end of the pipe 22. A spring 33 is provided which bears against the lid 32 and on the gasket 31 and provides the means for holding the gaskets 28 and 30 firmly against the container 16 to seal off the annular space 20.

The body 10 is detachably attached to a frame member associated with the internal combustion engine for supporting and holding in operating position the filter in the following manner. The frame member to which the entire assembly may be attached is represented by the numeral 33' which may be for example the fire board of an automobile. A spacing member 34 is provided which may be of wood or like material.

Referring to Figure 2, the detachable support is made up of the L-shaped plate member 35 and the plate member 36. A support member 37 is welded to the lowermost flange fin member 38 flush with the flanged portion of the fin and has two openings therein through which the pins 39 may be inserted. Similar openings are provided in the uppermost fin 40 through which the pins 41 may be inserted. The pins 41 are fixedly attached to the fin 40 by means of the cotter pins 42. The L-shaped plate member 35 is fastened to the fire board 33 through the spacer 34 by means of the screws 43. The plate 36 is detachably attached to the plate 35 by having alternating spaced lugs 44 on each of the plates 35 and 36 and the lugs have openings aligned with each other through which the pin or bolt 45 may be inserted and held in place by the cotter pin 46.

Thus the filter may be readily cleaned without removing the hose connections attached to the oil inlet 15 or the oil outlet 24 by simply removing the cotter pin 46 and the bolt 45 and raising the entire assembly off of the pins 39. It should be noted that the plate 36 is attached to the cylindrical body 10 by means of the pins 41 and the cotter pins 42 but a similar attachment is not provided for the plate 35 and is attached only loosely by means of the pins 39 in order that the oil filter and cooler assembly may be readily removed upon the removal of the pin or bolt 45.

The oil flows through the system in the following manner. Hot oil from the crank case may be brought from the main pressure line or the discharge side of the oil pressure pump through the inlet connection 15. A reservoir of oil accumulates in the oil reservoir space 29. It then flows upward around the container 16 through the annular space 18 and is cooled by radiation by means of the fins 14. The oil then passes through the relative small openings 19 into the filtering material 17 and passes transversely across the filter and leaves the filter container by the means of the relatively small openings 21. All of the oil which is now cooled and filtered passes through the opening 26 and pipe 22 and out through the outlet 24.

The above description of the drawings is only given by way of example and many other modifications within the scope of my invention are apparent. My invention is only limited by the following claim.

I claim as my invention:

An oil filter and cooler comprising a body having a cylindrical portion opened at one end and having a concave closure on the other end, a cylindrical container having a filter space for containing filtering material within said container, filtering material in said filtering space, said container extending coextensively with the cylindrical portion of said body and having its outer wall spaced from the inner wall of the body to form a first annular space, relatively small openings in the outer wall of the container connecting said filter space with the first annular space, said container also having an inner opening therethrough coextensively and concentric with the first annular space, the walls of said inner opening having relatively small openings therein connecting said filter space with said inner opening, the end of the container and the concave closure of the body forming therebetween a space for an oil reservoir, an oil inlet through said concave closure connecting with said oil reservoir space, a pipe through said inner opening of said container closed the one end and the other end extending through the concave closure forming an oil outlet, said pipe being smaller in diameter than said inner opening of said container thereby forming a second annular space concentric with the first annular space, an opening in said pipe connecting with said second annular space, a support for said container positioned around said pipe and resting on the concave closure end of said body, a gasket on said support positioned tightly around said pipe to seal off said second annular space from said oil reservoir space, a second gasket positioned tightly around said pipe for sealing off the other end of said second annular space, a concave lid for the opening in said body, means for attaching said lid to said body through a threaded connection associated with and engaging said lid and said closed end of said pipe, a spring in said lid for holding said gaskets tightly against said container, a plurality of cooling fins fixedly attached around the outer circumference of said body and extending radially outward from said body and a support for holding said body in operative position comprising a plate support member detachably attached to said body, an L-shaped support member fixedly attached to a frame member of the internal combustion engine, said second support member being detachably attached to said body by pins in the horizontal leg of said L-support, said pins engaging openings in a plate attached to said body, the plate support member and the L-shaped support member being detachably connected by having alternating lugs on each member with aligned holes in the lugs to receive a pin, and a pin through said holes for detachably connecting said supporting members, said pin being the only removable part required to be detached for removing said filter from said support.

WILLIAM S. COLLIER.

REFERENCES CITED

The following references are of record in the file of this patent:

UNITED STATES PATENTS

| Number | Name | Date |
|---|---|---|
| 1,464,822 | Justus | Aug. 14, 1923 |
| 1,791,046 | Sweetland | Feb. 3, 1931 |
| 1,906,984 | Lyman | May 2, 1933 |
| 2,277,737 | Wilkinson | Mar. 31, 1942 |
| 2,277,738 | Wilkinson | Mar. 31, 1942 |
| 2,305,654 | Wilkinson | Dec. 22, 1942 |
| 2,354,645 | Bateman | Aug. 1, 1944 |